US006789141B2

(12) United States Patent
Ayukawa et al.

(10) Patent No.: US 6,789,141 B2
(45) Date of Patent: Sep. 7, 2004

(54) INFORMATION PROCESSING APPARATUS AND COMMUNICATION PATH SELECTION METHOD

(75) Inventors: Erika Ayukawa, Kawasaki (JP); Toyohisa Morita, Sagamihara (JP); Takashi Oeda, Sagamihara (JP)

(73) Assignee: Hitachi, Ltd., Tokyo (JP)

(*) Notice: Subject to any disclaimer, the term of this patent is extended or adjusted under 35 U.S.C. 154(b) by 224 days.

(21) Appl. No.: 10/100,113

(22) Filed: Mar. 19, 2002

(65) Prior Publication Data

US 2003/0177290 A1 Sep. 18, 2003

(30) Foreign Application Priority Data

Mar. 15, 2002 (JP) ........................................ 2002-071634

(51) Int. Cl.[7] ................................................ G06F 3/00
(52) U.S. Cl. ........................................................ 710/38
(58) Field of Search ................................ 710/38, 5, 29, 710/31; 370/395.41, 395.42, 395.43, 395.5

(56) References Cited

U.S. PATENT DOCUMENTS

| | | | | |
|---|---|---|---|---|
| 5,428,650 A | * | 6/1995 | Pitot | 375/377 |
| 5,553,095 A | * | 9/1996 | Engdahl et al. | 375/222 |
| 6,434,637 B1 | * | 8/2002 | D'Errico | 710/38 |
| 6,556,632 B1 | * | 4/2003 | Kubo et al. | 375/341 |
| 6,654,346 B1 | * | 11/2003 | Mahalingaiah et al. | 370/235 |
| 2001/0007557 A1 | * | 7/2001 | Yamada et al. | 370/389 |

OTHER PUBLICATIONS

EMC Web Page, http://www.emc2.co.jp/, 2002.

* cited by examiner

Primary Examiner—Jeffrey Gaffin
Assistant Examiner—David Martinez
(74) Attorney, Agent, or Firm—Mattingly, Stanger & Malur, P.C.

(57) ABSTRACT

An information processing apparatus having a common storage accessible by a host includes: an NIC group connected with a plurality of communication paths connected to the host; an I/O processing unit for executing I/O processing of the common storage in response to an I/O request of the host; a storing unit for holding log information for each data transfer performed from/to the host; and a communication path selection unit for selecting, as a data transfer path, a communication path having actually indicated good I/O processing performance among communication paths used in the past data transfer approximate in a communication condition by referring to the log information held by the storing unit.

7 Claims, 9 Drawing Sheets

FIG.2

| 121A | 121B | 121C | 121D |
|---|---|---|---|
| COMMUNICATION PATH IDENTIFIER | STORAGE-SIDE NIC IDENTIFIER | HOST-SIDE NIC IDENTIFIER | HOST IDENTIFIER |
| N1 | aaa.bbb.ccc.ddd | aaa.aaa.bbb.bbb | H1 |
| N2 | ee:ff:gg:hh:ii:jj | cc:cc:dd:dd:ee:ee | H1 |
| N3 | kkk.lll.mmm.nnn | fff.fff.ggg.ggg | H2 |
| ⋮ | ⋮ | ⋮ | ⋮ |

FIG.3

| 125A | 125B | 125C | | | | |
|---|---|---|---|---|---|---|
| | | 125C$_1$ | 125C$_2$ | 125C$_3$ | 125C$_4$ | |
| HOST IDENTIFIER | COMMUNICATION IDENTIFIER | DATA SIZE | SERVICE | TIME ZONE | PRIORITY | ⋯ |
| H1 | C1 | 15 | www | 13s TIME RANGE | 3 | ⋯ |
| H1 | C2 | 12560 | STREAMING | 20s TIME RANGE | 5 | ⋯ |
| H2 | C1 | 2 | MAIL | 7s TIME RANGE | 1 | ⋯ |
| ⋮ | ⋮ | ⋮ | ⋮ | ⋮ | ⋮ | ⋱ |

FIG.4

| HOST IDENTIFIER 123A | COMMUNICATION IDENTIFIER 123B | COMMUNICATION PATH IDENTIFIER 123C |
|---|---|---|
| H1 | C1 | N1 |
| H1 | C2 | N2 |
| H2 | C1 | N5 |
| ⋮ | ⋮ | ⋮ |

FIG.5

| HOST IDENTIFIER 124A | COMMUNICATION IDENTIFIER 124B | COMMUNICATION PERIOD 124C | CPU USAGE RATE 124D | ... |
|---|---|---|---|---|
| H1 | C1 | 5.0 | 0.21 | ... |
| H1 | C2 | 62.3 | 0.07 | ... |
| H2 | C1 | 0.2 | 0.01 | ... |
| ⋮ | G | ⋮ | ⋮ | ⋱ |

FIG.6

| 122A | 122B | 122C | 122D | 122E | 122F | 122G | 122H | 122I |
|---|---|---|---|---|---|---|---|---|
| HOST IDENTIFIER | COMMUNICATION IDENTIFIER | COMMUNICATION PATH IDENTIFIER | DATA SIZE | SERVICE | TIME ZONE | PRIORITY | COMMUNICATION PERIOD | CPU USAGE RATE |
| H1 | C1 | N1 | 15 | www | 13s TIME RANGE | 3 | 5.0 | 0.21 |
| H1 | C2 | N2 | 12560 | STREAMING | 20s TIME RANGE | 5 | 62.3 | 0.07 |
| H2 | C1 | N5 | 2 | MAIL | 7s TIME RANGE | 1 | 0.2 | 0.01 |
| ... | ... | ... | ... | ... | ... | ... | ... | ... |

- 122A–122D: SELECTION RESULT INFORMATION
- 122E–122G: COMMUNICATION CONDITION INFORMATION
- 122H–122I: COMMUNICATION PERFORMANCE INFORMATION

FIG.8

| HOST IDENTIFIER | I/O COMMUNICATION IDENTIFIER | COMMUNICATION PATH IDENTIFIER | DATA LENGTH | SERVICE | TIME ZONE COMMUNICATION PERIOD | PRIORITY | ... | COMMUNICATION PERIOD | CPU USAGE RATE | ... | COMMUNICATION RATE |
|---|---|---|---|---|---|---|---|---|---|---|---|
| H1 | C1 | N1 | 15 | www | 13s TIME RANGE | 3 | ... | 5.0 | 0.21 | ... | 3.0 |
| H1 | C2 | N2 | 12560 | STREAMING | 20s TIME RANGE | 5 | ... | 62.3 | 0.07 | ... | 201.6 |
| H2 | C1 | N5 | 2 | MAIL | 7s TIME RANGE | 1 | ... | 0.2 | 0.01 | ... | 10.0 |
| ... | ... | ... | ... | ... | ... | ... | ... | ... | ... | ... | ... |

- 122A–122C: SELECTION RESULT INFORMATION
- 122D–122G: COMMUNICATION CONDITION INFORMATION
- 122H–122J: I/O PROCESSING PERFORMANCE

INFORMATION PROCESSING APPARATUS AND COMMUNICATION PATH SELECTION METHOD

BACKGROUND OF THE INVENTION

The present invention relates to a technology of selecting an optimal data transfer path among a plurality of communication paths connecting information processing apparatuses one another.

It is known in conventional technology to provide management software improving data transfer efficiency between one or more storage devices and one ore more clients. This management software has a function of selecting one of LAN (a local area network) and SAN (a storage area network) as a data transfer path in response to a size of data transferred between one or more storage devices and one or more clients. Upon receiving NFS/CIFS (a network file system/common internet file system) file request from the host via LAN, the management software returns metadata indicating a data position in the storage to the host. Thus, the host directly makes a request for the data to the storage via the SAN. Meanwhile, when a size of the transfer data is small, and there is no merit in transferring the data via the SAN, the management software selects the LAN as a data transfer path.

However, in the conventional technology described above, the optimal data transfer path cannot be always selected among the plurality of communication paths connecting the storage and the host. For example, under the condition where a network such as the Internet dynamically changing characteristics thereof (e.g., traffic and communication rate) exists between the host and the storage, when a user requests selection of the optimal data transfer path from a viewpoint of improving the data transfer efficiency, such a request cannot be always satisfied even if a data transfer path is selected based on only the size of the transfer data.

Accordingly, an object of the present invention is to provide an information processing apparatus capable of selecting the optimal communication path among the plurality of communication paths even if the plurality of communication paths existing among information processing apparatuses change the characteristic thereof.

SUMMARY OF THE INVENTION

The present invention is directed an information processing apparatus providing, to a host, a common storage accessible by the host. The apparatus includes an interface connecting portion having a plurality of communication paths connected to the host; an I/O processor for executing I/O processing of the common storage in response to an I/O request of the host; and a storage for storing, as log information for each data transfer executed between the host and the interface connecting portion, corresponding information among an identifier of a communication path used for the data transfer, a communication condition used for the data transfer and performance information indicating I/O processing performance of the host. The I/O processing performance is measured during the data transfer. The apparatus also includes a communication path selecting portion for comparing a communication condition used for transferring objective data of the I/O request and a communication condition of the log information when the objective data of the I/O request is transferred between the host and the interface connecting portion, and for selecting a communication path identified by an identifier as a communication path use for transferring the objective data of the I/O request among the plurality of communication paths, the identifier being included in a communication log selected based on the performance information of one or more communication logs among the one or more communication logs determined based on a result of the comparison.

BRIEF DESCRIPTION OF THE DRAWINGS

Preferred embodiments of the present invention will now be described in conjunction with the accompanying drawings, in which:

FIG. 2 is a diagram conceptually showing a data structure of a management table of communication path information according to the one embodiment of the present invention;

FIG. 3 is a diagram conceptually showing a data structure of a management table of communication condition according to the one embodiment of the present invention;

FIG. 4 is a diagram conceptually showing a data structure of a management table of communication path selection results according to the one embodiment of the present invention;

FIG. 5 is a diagram conceptually showing a data structure of a management table of I/O processing performance according to the one embodiment of the present invention;

FIG. 6 is a diagram conceptually showing a data structure of a communication log management table according to the one embodiment of the present invention;

FIG. 8 is a diagram conceptually showing a data structure of the communication log management table according to the one embodiment of the present invention;

DESCRIPTION OF THE PREFERRED EMBODIMENTS

Hereinafter, description will be made for one embodiment according to the present invention with reference to the accompanying drawings.

Figure 1:
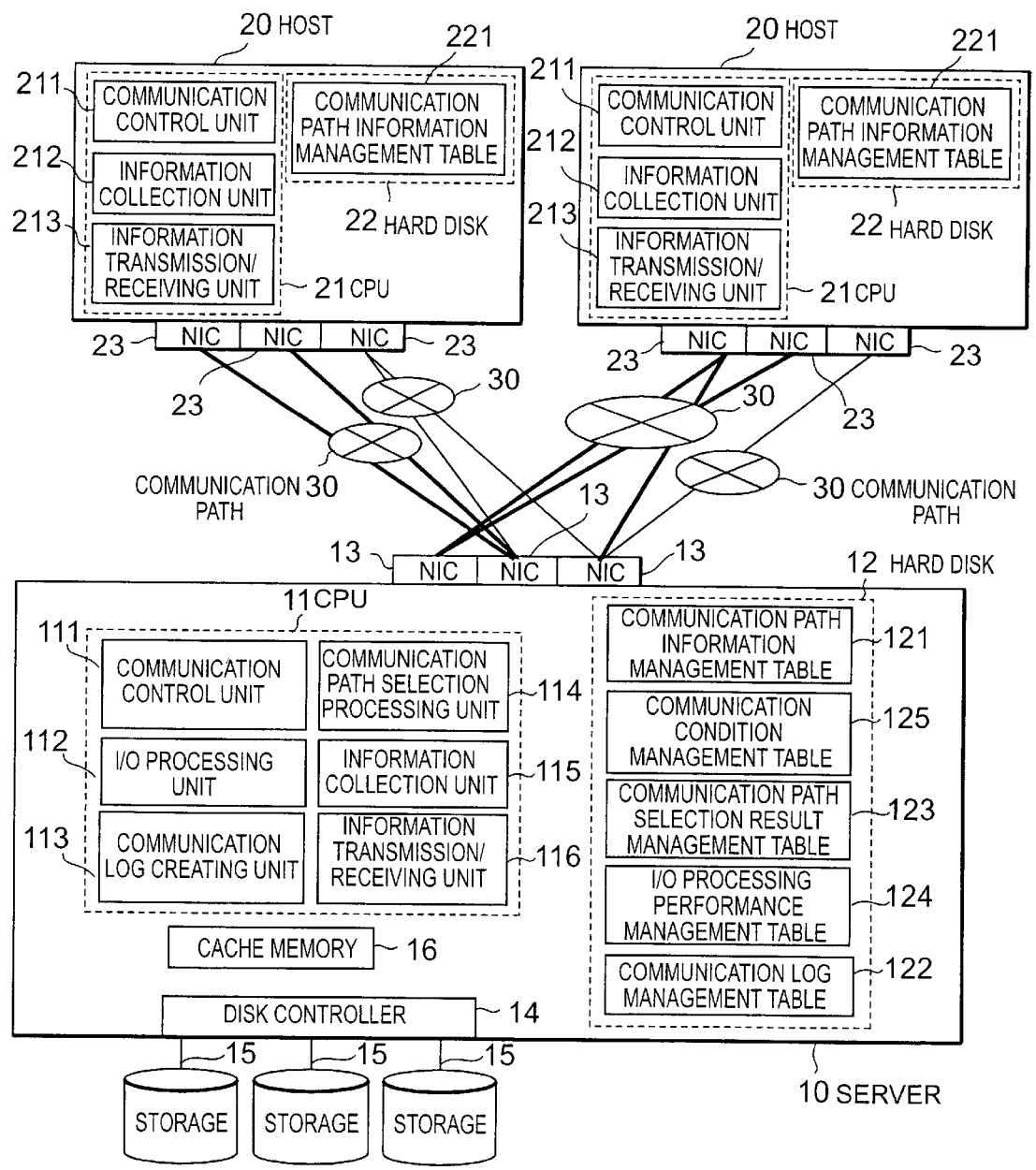
FIG. 1 is a constitutional view schematically showing a storage system according to one embodiment of the present invention.

First, description will be made for a configuration of a storage system according to this embodiment with reference to FIG. 1.

The storage system according to this embodiment includes one or more information processing apparatuses (hereinafter referred to as servers) 10 providing a common storage and one or more information processing apparatuses (hereinafter referred to as hosts) 20 connected to the servers 10 via a plurality of communication paths 30. In FIG. 1, as an example, a schematic configuration of a storage system including one server 10 and two hosts 20 is shown.

In this storage system, any mode of connecting to the server 10 and the hosts 20 via the respective communication paths may be adopted. For example, the connection mode may be a network connection mode such as Ethernet, a wireless net work and an asynchronous transfer mode (ATM) or may be a fiber channel. Moreover, any aspect of connecting to the server 10 and the hosts 20 may be also adopted, and an interchange device such as a repeater, a router and a gateway, a firewall or the like may exist in any communication path.

In the server 10, there are built in one or a plurality of network interface cards (NICs) 13 to which the plurality of communication paths can be connected, a hard disk 12 installed with a management program in which communication log creating processing and data transfer processing to be described later are defined, with an operating system (OS) and the like, a memory (not shown), a CPU 11 executing the program loaded from the hard disk 12 to the memory, a disk controller 14, a cache memory 16 for speeding up I/O processing, and buses (not shown) mutually connecting the above components. Moreover, for example, one or more hard disks 15 provided as common storages are connected to the disk controller 14. Here, as the common storages, the hard disks 15 are used. However, general storages such as magnetic tape storage devices and optical disks other than the hard disks may be used as the common storages. However, in any case of using any of the storages, it is necessary for data storage areas thereof to be segmented in units (volumes, partitions, blocks and sets thereof, files or the like) accessible by the hosts 20.

By means of the hardware and the program, which are described as above, the server 10 realizes a communication control unit 111 for transmitting/receiving data of a specified size or more (objective data of an I/O request) to/from the hosts 20, a communication path selection processing unit 114 for selecting communication paths among the plurality of communication paths 30, the selected communication paths being used as data transfer paths from/to the hosts 20 by the communication control unit 111, an information transmission/receiving unit 116 for transmitting/receiving data of size less than the specified size (an I/O request or the like) from/to the hosts 20 via communication paths, each being predetermined for each host 20, an I/O processing unit 112 for executing I/O processing for the common storage 15 or the cache memory 16, an information collection unit 115 for collecting communication conditions of the data of the specified size or more, and a communication log creating unit 113 for creating a communication log based on the collected information in the information collection unit 115 and the like. To these functional composition units, other functions can be added according to needs. For example, the communication control unit 111 may be made to execute general communication processing (initializing processing, termination processing, authentication processing, encryption processing or the like) in connection-oriented communication.

Note that the management program for realizing these functional compositions may be the one installed in the hard disk 12 from a storage medium or the one installed in the hard disk 12 via the communication path.

Moreover, in the hard disk 12 built in the server 10, besides the management program and the like, five kinds of data tables referred to by this management program are further stored. Concretely, a communication path information management table 121, a communication condition management table 125, a communication path selection result management table 123, an I/O processing performance management table 124, and an I/O processing log management table 122 are stored. These data tables 121 to 125 have data structures to be described below, respectively.

In the communication path information management table 121, as shown in FIG. 2, for each communication path selectable as a transfer path of objective data (write data to the common storage and readout data from the common storage) of the I/O request of each of the hosts 20, information regarding the communication path (communication path information) is registered. In each piece of communication path information, an identifier of the communication path (communication path identifier) 121A, identifiers (NIC identifiers) of two NICs (an NIC of the server 10 and an NIC of the host 20) connected to the communication path 121B and 121C, and an identifier (host identifier) 121D of the host 20 possessing the NIC determined by the one NIC identifier 121C are included. Here, in the NIC identifiers 121B and 121C, any information may be set as far as the server and the host may specify the NICs of each other. For example, IP addresses, MAC addresses, information obtained by combining the IP addresses and Port numbers, world wide names (WWN) and the like may be set. The information that can become the NIC identifiers as described above may be acquired by making a request for input thereof to managers of the host 20 and the server 10 or from a name server and the like. Alternatively, with regard to the NIC identifier of the host 20, a combination of a sender address and a destination address of a packet when the packet is transmitted from the host 20 to the server 10 can be acquired as two NIC identifiers 121B and 121C included in one communication path identification information.

In the communication condition management table 125, as shown in FIG. 3, for each data transfer executed between each of the hosts 20 and the server 10, a host identifier 125A of the host 20, an identifier of the data transfer (communication identifier) 125B and communication condition information used for the data transfer are registered. For example, each piece of the communication condition information 125C can include size of the objective data for the I/O request (data size) $125C_1$, a service name $125C_2$ provided to a user by application having issued the I/O request to a logical volume manager (LVM) on the host 20, I/O request issuing time zone $125C_3$, and priority $125C_4$ set to the objective data for the I/O request by the user. These pieces of information $125C_1$, $125C_2$, $125C_3$ and $125C_4$ are enumerated as examples of information included in the communication condition information. Hence, it is not necessary for all of these pieces of information $125C_1$, $125C_2$, $125C_3$ and $125C_4$ to be included in the communication condition information 125C. Moreover, other information affectable to the I/O processing performance of the hosts to the server may be included in the communication condition information 125C. Note that, since the communication identifier 125B is information determined uniquely for each host, a plurality of communication identifies are repeatedly registered in the communication condition management table 125 in some cases.

In the communication path selection result management table 123, as shown in FIG. 4, every time when the data transfer is carried out between the server 10 and each of the hosts 20, information (communication path selection result information) indicating a result of communication path selection processing (refer to FIG. 11) performed prior to the data transfer is registered. In each of the communication path selection result information, a host identifier 123A of the host 20 having accessed the server 10, a communication identifier 123B of the data transfer and a communication path identifier 123C of a communication path used for the data transfer are included. These pieces of information 123A, 123B and 123C are enumerated as examples of information included in the communication path selection result information. Hence, information other than these pieces of information 123A, 123B and 123C may be included in the communication path selection result information.

In the I/O processing performance management table 124, as shown in FIG. 5, for each data transfer carried out between the host 20 and the server 10, a host identifier 124A of the host 20, a communication identifier 124B of the data transfer and information (I/O processing performance information) regarding the I/O processing performance detected during the data transfer are registered. Each piece of the I/O processing performance information can include, for example, a period required for the data transfer (a communication period) 124C and a CPU usage rate 124D of the host 20 during the data transfer. These pieces of information 124C and 124D are shown as examples of information included in the I/O processing performance information. Hence, it is not necessary for all of these information 124C and 124D to be included in the I/O processing performance information. Moreover, other information regarding the I/O processing performance detected during the data transfer may be included in the I/O processing performance information.

In the communication log management table 122, as shown in FIG. 6, the logs of the data transfer executed between each of the hosts 20 and the server 10 are registered as indexes for selecting the communication path used for the next data transfer executed between the host 20 and the server 10. Each of the communication logs includes date information (not shown) indicating a registration date of the communication log, communication path selection result information (a host identifier 122A, a communication identifier 122B and a communication path identifier 122C) similar to the communication path selection result information registered in the communication path selection result management table 123, communication condition information (a data size 122D, a service name 122E, an I/O request issuing time zone 122F and a priority 122G) similar to the communication condition information in the communication condition management table 125, and I/O processing performance information (a communication period 122H and a CPU usage rate 122I) similar to the I/O processing performance information in the I/O processing performance management table 124.

Meanwhile, in each host 20, there are built in one or more network interface cards (NICs) 23 connectable to the plurality of communication paths 30, a hard disk 22 installed with a communication program in which data transfer processing to be described later is defined, with an operating system (OS) and the like, a memory (not shown), a CPU 21 executing the program loaded from the hard disk 22 to the memory, and buses (not shown) mutually connecting the above components.

By means of the hardware and the program, which are described as above, the host 20 realizes a communication control unit 211 for transmitting/receiving data of a specified size or more (an I/O request accompanying write data) to/from the server 10, an information collection unit 212 for collecting communication condition information of the data transfer carried out by the communication control unit 211 and the I/O processing performance information, and an information transmission/receiving unit 213 for transmitting/receiving data of size less than the specified size (an I/O request or the like) to/from the server 10 via a predetermined communication path. To these functional composition units, other functions can be added according to needs. For example, the communication control unit 211 may be made to execute general communication processing (initializing processing, termination processing, authentication processing, encryption processing or the like) in the connection-oriented communication.

Note that the communication program for realizing these functional compositions may be the one installed in the hard disk 22 from the storage medium or the one installed in the hard disk 22 via a signal transmission medium.

Moreover, in the hard disk 22 built in the host 20, besides the communication program and the like, a data table 221 of a data structure similar to that of the communication path information management table 121 stored by the server 10 is further stored. However, in the communication path information management table 221 stored by the host 20, only communication path information including a host identifier of the host 20 is registered.

Next, description will be made for the processing executed by the storage system according to this embodiment.

(1) Communication Log Creating Processing Executed by Server 10

Figure 7:
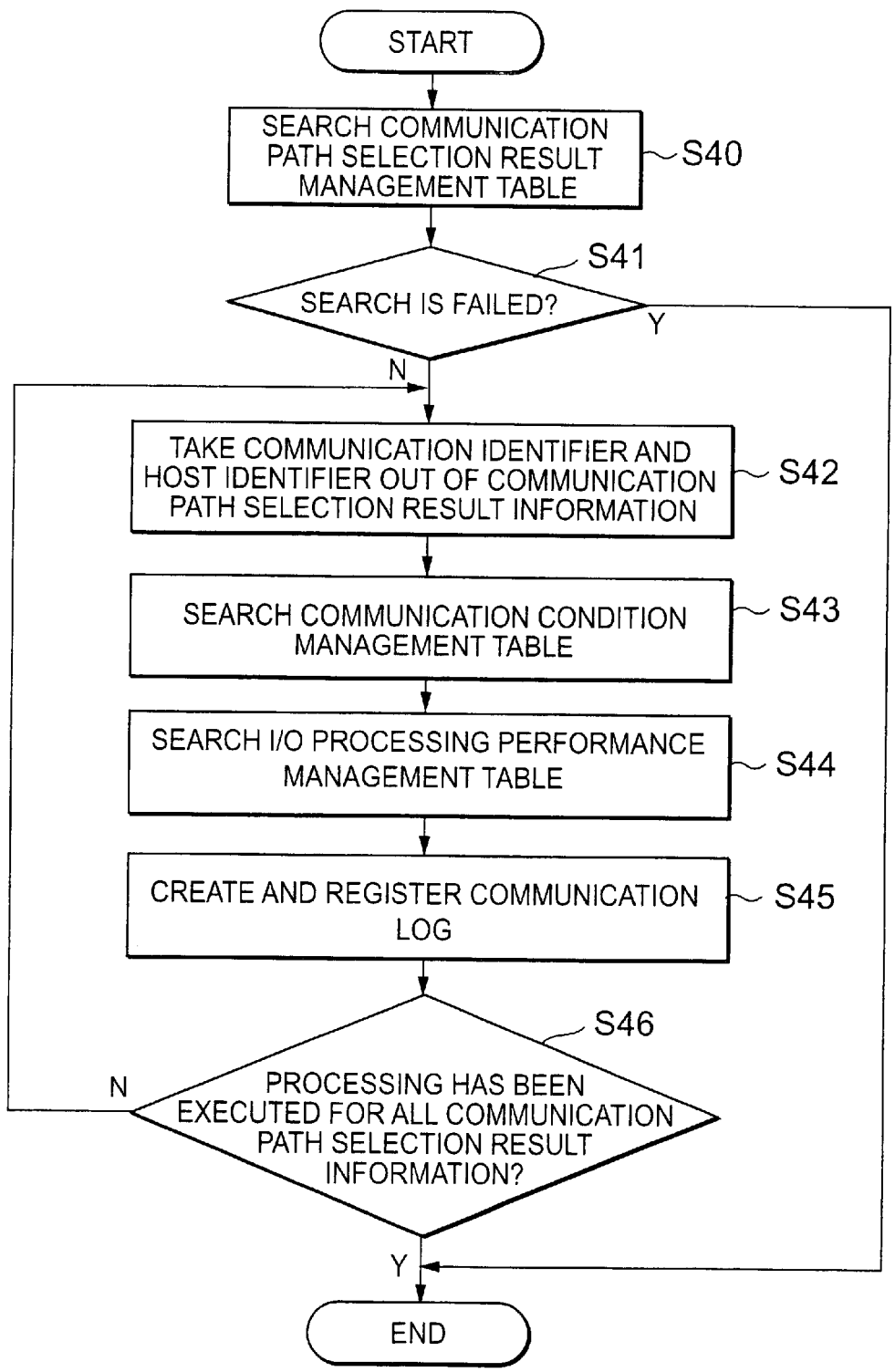
FIG. 7 is a flowchart of communication log creating processing according to the one embodiment of the present invention.

In the server 10, the communication log creating processing is executed by the communication log creating unit 113 periodically or at suitable timing such as immediately before reference to the communication log management table 122. A flowchart of this communication log crating processing is show in FIG. 7.

The communication log creating unit 113 takes the entire communication path selection result information out of the communication path selection result management table 123 (S40).

In this case, if the communication path selection result information cannot be taken out of the communication path selection result management table 123 (S41), then the communication log creating unit 113 terminates the communication log creating processing.

On the other hand, if the communication path selection result information can be taken out of the communication path selection result management table 123 (S41), then the communication log creating unit 113 further executes processing below for each communication path selection result information.

The communication log creating unit 113 takes the communication identifier and the host identifier out of the communication path selection result information (S42), and takes communication condition information made to correspond to communication and host identifiers common thereto out of the communication condition management table 125 (S43). Furthermore, the communication log creating unit 113 takes I/O processing performance information made to correspond to communication and host identifiers common to the communication and host identifiers taken out in S42 out of the I/O processing performance management table 124 (S44).

Then, the communication log creating unit 113 merges the communication condition information taken out in S43, the I/O processing performance information taken out in S43 and the communication path selection result information to create a communication log, and registers this communication log in the communication log management table. In this case, if a space area of the hard disk 12 is short, then the communication log creating unit 113 deletes the communication logs in an old order of the registration dates indicated by the date information from the communication log management table 122, and then registers a newly created communication log in the communication log management table 122 (S45).

The communication log creating unit 113 determines whether or not the processing described above (S42 to S45)

has been executed for the entire communication path selection result information taken out of the communication path selection result management table 123. Consequently, if communication path selection result information that has not been subjected to the above processing (S42 to S45) exists, then the above processing (S42 to S45) is executed for the communication path selection result information. In the case other than this, the communication log creating unit 113 deletes the entire communication path selection result information from the communication path selection result management table 121, and deletes the entire I/O processing performance information from the I/O processing performance management table 124, then terminates the communication log creating processing.

According to the communication log creating processing as described above, the communication log of the data transfer executed between the host and the server on and after the execution of the previous communication log creating processing is registered in the communication log management table. By repeatedly executing the communication log creating processing as described above, the communication log taken as the index when selecting the communication path used for the data transfer executed between the host and the server can be updated to be an up-to-date one reflecting the characteristic of each communication path.

Note that, in the above, if the space area of the hard disk built in the server is short, then the old communication logs are deleted from the communication log management table, however, this deletion is not always necessary. For example, a configuration may be adopted, in which an upper limit value is previously determined for the registration number of communication logs, and when the number of communication logs registered in the communication log management table reaches the upper limit value, the old communication logs are deleted from the communication log management table. Alternatively, another configuration may be adopted, in which a storage time period of the communication logs is previously determined, and communication logs having passed the storage time period from the registration time are periodically deleted from the communication log management table 122.

Moreover, in the above, the I/O processing performance information taken out of the I/O processing performance management table is used as it is as the I/O processing performance information of the communication logs, however, it is not always necessary to do in such a manner. For example, information created from the I/O processing performance information taken out of the I/O processing performance management table and from the communication condition taken out of the communication condition management table may be includes in the I/O processing performance information of the communication logs. Concretely, in S45, a communication rate is calculated by dividing the size of data included in attribute information by the communication period included in the I/O processing performance information, and as shown in FIG. 8, this communication rate 122J may be included in the I/O processing performance information of the communication logs.

(2) Data Transfer Processing Executed Between Server 10 and Host 20

When any of the hosts 20 accesses the common storages 15 of the server 10, the data transfer processing is executed between the host 20 and the server 10. Flowcharts of this data transfer processing are shown in FIG. 9 and FIG. 10.

Figure 9:
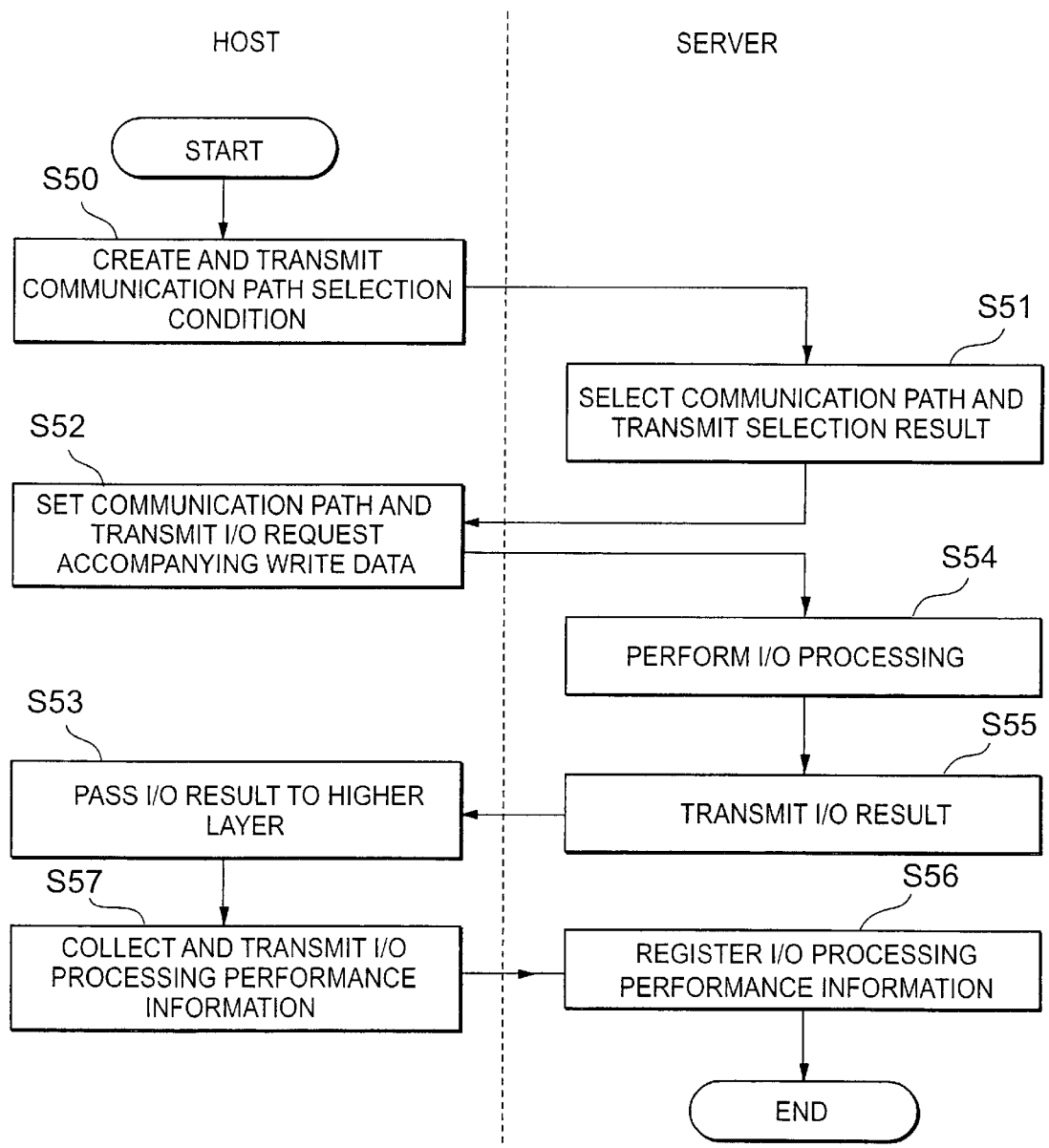
FIG. 9 is a flowchart of data transfer processing according to the one embodiment of the present invention.
Figure 10:
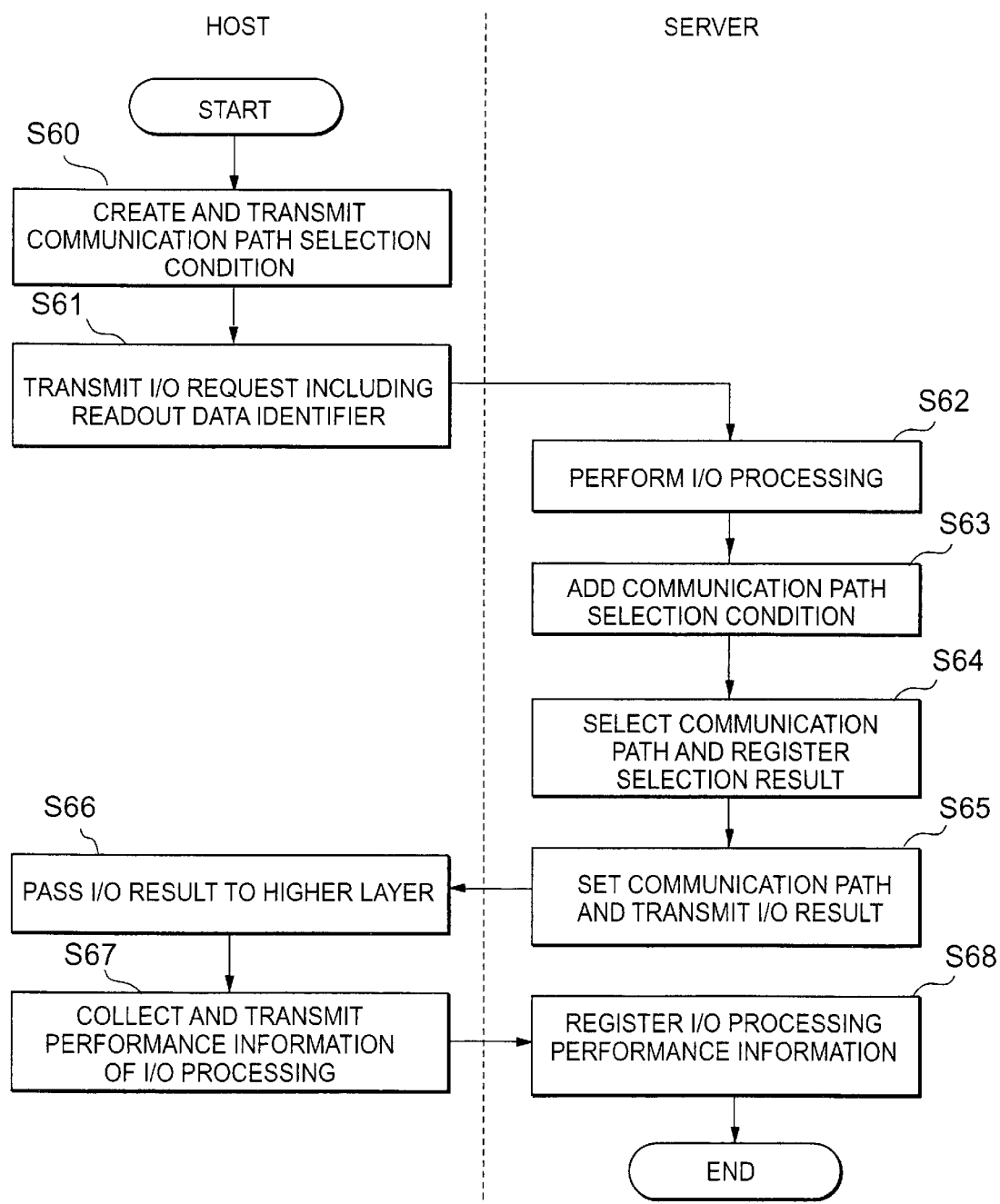
FIG. 10 is a flowchart of data transfer processing according to the one embodiment of the present invention.

When application at a higher layer than those of a file system, the LVM and the like issues the I/O request accompanying the write data on the host 20, the data transfer processing shown in FIG. 9 is executed.

First, in the host 20, the information collection unit 212 collects the communication condition information (the size of write data, a service name provided by the application, the I/O request issuing time zone, the priority of write data and the like). Then, the information transmission/receiving unit 213 transmits a communication path selection request including the communication condition information via a specified communication path to the server 10 (S50).

In the server 10, the information transmission/receiving unit 116 receives the communication path selection request from the host 20. When the information transmission/receiving unit 116 passes a host identifier of the host sending the communication path selection request and the communication condition information included in the communication path selection request to the communication path selection processing unit 114, the communication path selection processing unit 114 allocates a communication identifier to the data transfer performed from/to the host sending the communication path selection request at this time. Then, the communication path selection processing unit 114 additionally registers the communication identifier and the information passed thereto from the information transmission/receiving unit 116 in the communication condition management table 125, and then executes communication path selection processing to be described later (refer to FIG. 11). Thus, a communication path identifier of the communication path used for transmitting the I/O request is selected. Furthermore, the communication path selection processing unit 114 creates communication path selection result information including the communication path identifier selected at this time and both of the host identifier and the communication identifier, which are passed from the information transmission/receiving unit 116, and then registers newly this communication path selection result information in the communication path selection result management table 123. Then, the information transmission/receiving unit 116 transmits the communication path selection result information created by the communication path selection processing unit 114 at this time to the host 20 sending the I/O request via the communication path predetermined for the host 20 sending the I/O request (S51).

In the host 20, the information transmission/receiving unit 213 receives the communication path selection result information from the server 10. When the information transmission/receiving unit 213 passes the communication path selection result information to the communication control unit 211, the communication control unit 211 takes the communication path identification information and the host identifier out of the communication path selection result information. Moreover, the communication control unit 211 takes two NIC identifiers (an NIC identifier of the server and an NIC identifier of the host) made to correspond to the communication path identification information and the host identifier, which are common to the taken-out communication path identification information and host identifier. Then, the communication control unit 211 sets the communication path determined by the two NIC identifiers as a data transfer path from/to the server 10, and starts transmission of the I/O request accompanying the write data via this communication path. In this case, when the write data is divided into a plurality of packet data, sequence numbers and the like may be added to the respective packet data.

In the server 10, when the communication control unit 111 receives the I/O request from the host 20, the I/O request is passed from the communication control unit 111 to the I/O processing unit 112. In this case, if the write data is divided into the plurality of packet data, and the sequence numbers are added to the respective packet data, then the communication control unit 111 rearranges the plurality of packet data in order of the sequence numbers, and then passes the packet data to the I/O processing unit 112. The I/O processing unit 112 executes the I/O processing in response to the I/O request. In this case, the write data having transmitted with the I/O request to the I/O processing unit 112 may be written to the common storages 15 after being stored once in the cache 16.

Thereafter, in the server 10, the I/O processing unit 112 passes an I/O result (e.g., a termination status and the like) to the information transmission/receiving unit 116. The information transmission/receiving unit 116 transmits the I/O result to the host sending the I/O result via the communication path predetermined for the host sending the I/O request (S55).

In the host 20, the communication control unit 211 receives the I/O result from the server 10, and the termination status is passed from the communication control unit 211 to the application issuing the I/O request (S56). Thereafter, in the host 20, further, the information collection unit 212 collects the I/O processing performance information (the communication period, the CPU usage rate, and the like), and the information transmission/receiving unit 213 transmits the I/O processing performance information to the server 10 via a specified communication path (S57).

In the server 10, when the information transmission/receiving unit 116 receives the I/O processing performance information (the communication period, the CPU usage rate and the like) from the host 20, the I/O processing performance information is passed from the information transmission/receiving unit 116 to the information collection unit 115. Then, the information collection unit 115 makes the I/O processing performance information correspond to the host identifier and the communication identifier, and registers the I/O processing performance information in the I/O processing performance management table 124 (S58).

As described above, the data transfer processing executed when the I/O request accompanying the write data is transmitted from the host 20 to the server 10 is completed.

Meanwhile, on the host 20, when the application at a higher layer than those of the file system, the LVM and the like issues the I/O request including identification information of the readout data (a readout data identifier), data transfer processing shown in FIG. 10 is executed.

First, in the host 20, the information collection unit 212 collects the communication condition information (the service name provided by the application, the I/O request issuing time zone, the priority of readout data and the like) other than the data size. Then, the information transmission/receiving unit 213 transmits the communication condition information to the server 10 via a specified communication path (S60). Furthermore, the information transmission/receiving unit 213 transmits the I/O request to the server 10 via a specified communication path (S61).

In the server 10, when the information transmission/receiving unit 116 receives the I/O request from the host 20, the I/O request is passed from the communication control unit 111 to the I/O processing unit 112. The I/O processing unit 112 executes the I/O processing in response to the I/O request. Thus, data determined by the readout data identifier included in the I/O request is read out of the cache 16 or the common storages 15 (S62). Then, referring to the data, the information collection unit 115 collects the communication condition information (the data size or the like) by the server side and read out at this time, and adds the communication condition information size to the communication condition information from the host 20 (S63). Furthermore, the communication path selection processing unit 114 allocates a communication identifier to the data transfer performed from/to the host issuing the I/O request at this time, and additionally registers the communication identifier and the communication condition information corrected by the information collection unit 115 in the communication condition management table 125, then executes the communication path selection processing to be described later (refer to FIG. 11). Thus, the communication path identifier of the communication path used for transmitting the I/O result (the readout data and the like) is selected. Furthermore, the communication path selection processing unit 114 creates communication path selection result information including the communication path identifier selected at this time, the host identifier of the host issuing the I/O request and the communication identifier allocated in S62, and newly registers the communication path selection result information in the communication path selection result management table 123 (S64).

Thereafter, in the server 10, the communication control unit 111 takes the communication path identifier selected by the communication path selection processing unit 114 and the two NIC identifiers (the NIC identifier of the server and the NIC identifier of the host) made to correspond to the host identifier of the host issuing the I/O request out of the communication path information management table 121. Then, the communication control unit 111 sets the communication path determined by these two NIC identifiers as a data transfer path used for transmitting an I/O result (the readout data and the like), and transmits the I/O result as response information to the I/O request via this communication path to the host (S65). In this case, when the I/O result is divided into a plurality of packet data, sequence numbers may be added to the respective packet data.

In the host 20, when the communication control unit 211 receives the I/O result, the I/O result is passed from the communication control unit 211 to the application issuing the I/O request (S66). At this time, when the I/O result is divided in to a plurality of packet data, and packet data each have sequence number attached thereto, the communication control unit 211 rearranges the plurality of packet data in order of the sequence number, thereafter sending them to the application which has issued the I/O request. Moreover, the communication control unit 212 collects the I/O processing performance information (the communication period, the CPU usage rate and the like), and the information transmission/receiving unit 213 transmits the I/O processing performance information to the server 10 via specified communication path (S67).

In the server 10, when the information transmission/receiving unit 116 receives the I/O processing performance information (the communication period and the CPU usage rate) from the host 20, the I/O processing performance information is passed from the information transmission/receiving unit 116 to the information collection unit 115. Then, the information collection unit 115 registers the I/O processing performance information, the host identifier and the communication identifier in the I/O processing performance management table 124 (S58).

In such a manner as described above, the data transfer processing executed when the I/O request including the readout data identifier is transmitted from the host 20 to the server 10 is completed.

Note that, in the above, when the server receives the I/O request including the readout data identifier, the server selects the communication path used for transmitting the response information to the I/O request. However, when a communication protocol defining that the I/O request and a response thereto are communicated via a common communication path is adopted between the host and the server, the server 10 may return the response information to the host via the communication path via which the I/O request has transmitted.

(3) Communication Path Selection Processing Executed by Server 10

Figure 11:
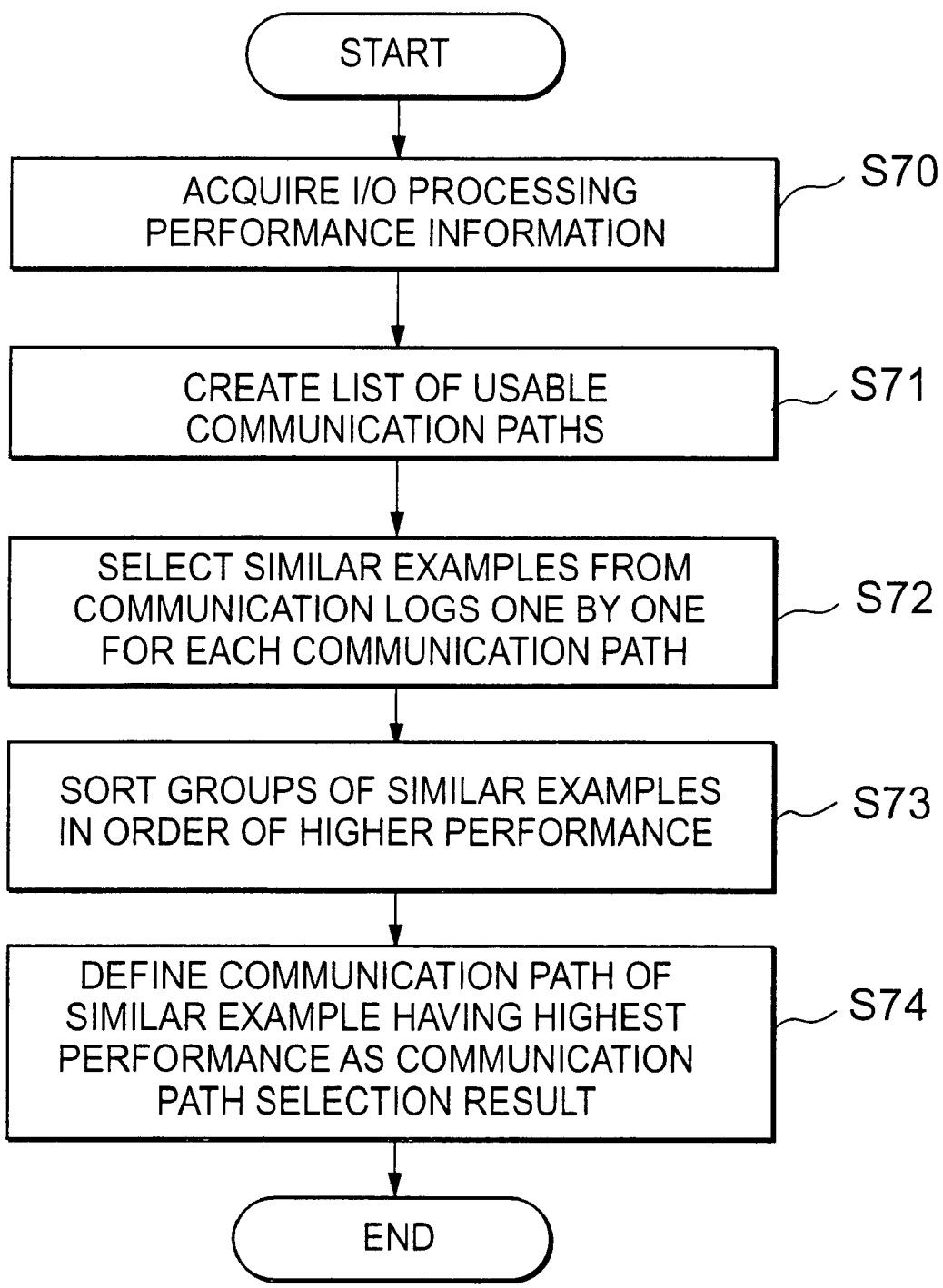
FIG. 11 is a flowchart of communication path selection processing according to the one embodiment of the present invention.

A flowchart of communication path selection processing executed by the server 10 is shown in FIG. 11.

When the communication path selection processing unit 114 acquires communication condition information and host identifiers (S70), the communication path selection processing unit 114 takes communication path identifiers made to correspond to the host identifiers out of the communication path information management table 121 entirely. Then, a communication path identifier list having groups of the communication path identifiers taken out at this time as composition components is created (S71).

Next, the communication path selection processing unit 114 takes a communication log including a communication path identifier out of the communication log management table 122 for each communication path identifier included in the communication path identifier list. Then, groups of the communication logs taken out by the above-described search are sorted by the communication path identifiers included in the groups. The communication path selection processing unit 114 selects a communication log including the most approximate communication condition information to the communication condition information acquired in S70 as a similar example one by one from the sorted groups (S72). As a concrete example of a method for selecting a similar example among the groups of the communication logs, the following method is enumerated. Specifically, weights of the respective pieces of component information of the communication condition information are previously set by the user, and as a similar example, a communication log including communication condition information is selected, in which the sum of values obtained by weighting differences between the respective pieces of component information of the communication condition information acquired in S70 and the component information corresponding thereto becomes minimum. As a matter of course, the similar example may be selected among the group of the communication logs taken out for each communication path identifier by other selection methods. For example, when the user designates a method for selecting a similar example, the similar example may be selected according to the method.

Groups of the similar examples, each being selected for each communication path identifier as described above, are sorted in order where the I/O processing performance indicated by the I/O processing performance information included in the similar example is higher (S73). As a concrete example of a method for sorting groups of similar examples by the communication information, the following method is enumerated. Specifically, weights of the respective pieces of component information of the I/O processing performance information are previously set by the user, and the groups of the communication logs are sorted in order where the sum of product of each component information of the I/O processing performance information and weight added with a code predetermined for the component information is smaller. In this method, a code added to the weight of the component information representing higher performance as a value thereof is smaller is negative, and a code added to the weight of the component information representing higher performance as a value thereof is larger is positive. As a matter of course, the groups of the similar examples may be sorted by a method other than this method. For example, when the user designates a sorting method of groups of similar examples, the groups of the similar examples may be sorted according to the sorting method.

The communication path selection processing unit 114 takes a communication path identifier as the communication path identifier of the communication path used as the data transmission path from/to the host 20 out of the first similar example in a column of the similar examples obtained by such sorting (S74).

According to the communication path selection processing described above, among the communication paths selected in the past examples approximate in the communication condition, a communication path, in which I/O processing performance conceived to be important by the user has actually indicated a particularly good value, can be selected as the data transfer path. Therefore, even if the characteristics of the plurality of communication paths connecting the host and the server are dynamically changed, the optimal data transfer path meeting the request of the user can be selected among the plurality of communication paths.

Note that, in the above, one communication path is selected as the data transfer path between the host and the server, however, two or more communication paths may be selected as the data transfer path between the host and the server, and the two or more communication paths may function virtually as one communication path.

Incidentally, in the communication path selection processing described above, the communication path, in which the I/O processing performance conceived to be important by the user has actually indicated a particularly good value, can be selected as the data transfer path. However, the communication path as the data transfer path may be selected in consideration of factors other than the I/O processing performance. Hereinafter, description will be made for a concrete example thereof.

When the user designates a metered rate as a charging method, the user sometimes desires that the communication path selection be made in consideration of a trade-off between the I/O processing performance and the cost.

In such a case, only the similar examples are taken, where the I/O processing performance designated by the user is excellent, out of the groups of the similar examples obtained in S72. Furthermore, out of the similar examples taken as described above, the ones may be taken, of which communication cost in accordance with the charging method designated by the user is low. For example, when the communication cost is desired to be suppressed while suppressing the CPU usage rate during the data transfer, processing to be described below may be executed in S73 and S74. First, the groups of the similar examples obtained in S72 are sorted in order where the CPU usage rate is lower, and similar examples from the first to a specified order in the column of the similar examples thus obtained are taken out. Thereafter, the groups of the similar examples taken out at this time are sorted in order where the communication period is shorter or the priority is lower. Finally, the communication path identifier is taken as the communication path identifier of the communication path used as the data transfer path from/to the host 20 from the first similar example of the column of the similar examples obtained by such sorting.

Alternatively, only similar examples capable of suppressing the communication cost to an amount designated by the user or less may be taken out of the groups of the similar example obtained in S72. Furthermore, out of the similar examples taken as described above, the ones may be taken, of which I/O processing performance designated by the user is excellent. For example, when the CPU usage rate during the data transfer is desired to be suppressed while suppressing the communication cost to the amount designated by the user or less, processing to be described below may be executed in S73 and S74. First, similar examples including the communication periods usable at the communication cost equal to the amount designated by the user or less are taken out. Thereafter, the groups of the similar examples taken out at this time are sorted in order where the CPU usage rate is lower. Finally, the communication path identifier is taken as the communication path identifier of the communication path used as the data transfer path from/to the host 20 from the first similar example of the column of the similar examples obtained by such sorting.

According to this embodiment, the communication path minimizing the cost while meeting the I/O processing performance requested by the user can be selected. Specifically, the communication path selection can be carried out in consideration of the trade-off between the I/O processing performance and the cost. As a matter of course, it is also possible to carry out communication path selection in consideration of a trade-off with a competition condition other than the I/O processing performance and the cost by a similar method.

In the above, consideration is not made for the case where a communication path having directivity such as the asymmetric digital subscriber line (ADSL) exists between the host and the server. In the case where such a communication path having directivity exists between the host and the server, it is desirable to add a data transmission direction to the communication condition information.

What is claimed is:

1. An information processing apparatus providing, to a host, a common storage accessible by the host, comprising:
   an interface connecting means with a plurality of communication paths connected to said host;
   I/O processing means for executing I/O processing of said common storage in response to an I/O request of said host;
   storing means for storing, as log information for each data transfer executed between said host and said interface connecting means, corresponding information among an identifier of a communication path used for the data transfer, a communication condition used for the data transfer and performance information indicating I/O processing performance of said host, the I/O processing performance being measured during the data transfer; and
   communication path selecting means for comparing a communication condition used for transferring objective data of said I/O request and a communication condition of said log information when the objective data of said I/O request is transferred between said host and said interface connecting means, and for selecting a communication path identified by an identifier as a communication path used for transferring the objective data of the I/O request among said plurality of communication paths, the identifier being included in a communication log selected based on the performance information of said communication logs of groups of the communication logs among the groups determined based on a result of the comparison, wherein
   said storing means stores log information including first performance information indicating first I/O processing performance and second performance information indicating second I/O processing performance in correlation with communication cost, and
   said communication path selecting means selects a communication path identified by an identifier as the communication path used for transferring the objective data of the I/O request, the identifier being included in communication logs selected among said groups of the communication logs based on the I/O processing performance indicated by said first performance information of the communication logs of said groups of the communication logs and the communication cost in correlation with the I/O processing performance indicated by said second performance information of the communication logs of said groups of the communication logs.

2. A program executed by an information processing apparatus providing a common storage accessible by a host to the host connected with a plurality of communication paths, the program allowing the information processing apparatus to execute:
   log creating processing for creating, for each data transfer performed between said host and the information processing apparatus itself, corresponding information among an identifier of a communication path used for the data transfer, a communication condition used for the data transfer and performance information indicating I/O processing performance of said host, the I/O processing performance being measured during the data transfer, and for holding the corresponding information as log information; and
   selection processing for comparing a communication condition used for transferring objective data of an I/O request to said common storage and a communication condition of said log information when the objective data of the I/O request is transferred between the host and the information processing apparatus itself, and for selecting a communication path identified by an identifier as a communication path used for transferring the objective data of the I/O request among the plurality of communication paths, the identifier being included in a communication log selected based on the performance information of the communication logs of groups of the communication logs among the groups determined based on a result of the comparison,
   wherein, in said log creating processing, said information processing apparatus creates log information including first performance information and second performance information in correlation with communication cost, and
   in said selection processing, said information processing apparatus selects a communication path identified by an identifier as the communication path used for transferring the objective data of said I/O request, the identifier being included in communication logs selected among said groups of the communication logs based on the I/O processing performance indicated by the first performance information of the communication logs of the groups of the communication logs and the communication cost in correlation with said I/O processing performance indicated by said second performance information of the communication logs of said groups of the communication logs.

3. The program according to claim 2,
   wherein, in said selection processing, the information processing apparatus selects one or more communication logs among the groups of the communication logs, the one or more communication logs having the communication cost in correlation with the I/O processing performance indicated by the second performance information becoming a value given from an outside or lower, an selects a communication path identified by an identifier included in a communication log having highest I/O processing performance indicated by the first performance information as the communication path used for transferring the objective data of the I/O request among the one or more communication logs.

4. A computer-readable storage medium, wherein the program according to claim 3 is stored.

5. The program according to claim 2, wherein, in said selection processing, said information processing apparatus selects a specified number of communication logs from a communication log having higher I/O processing performance indicated by said first performance information among said groups of the communication logs, and selects a communication path identified by an identifier included in a communication log having a lowest communication cost in correlation with the I/O processing performance indicated by said second performance information as the communication path use for transferring the objective data of said I/O request among the specified number of communication logs.

6. A computer-readable storage medium, wherein the program according to claim 5 is stored.

7. A computer-readable storage medium, wherein the program according to claim 2 is stored.

* * * * *